US008969439B2

(12) United States Patent  
Symons

(10) Patent No.: US 8,969,439 B2  
(45) Date of Patent: Mar. 3, 2015

(54) METHOD OF AGGLOMERATION

(75) Inventor: Michael Windsor Symons, Pretoria (ZA)

(73) Assignee: Enviroserv Waste Management Limited, Germiston (ZA)

(*) Notice: Subject to any disclaimer, the term of this patent is extended or adjusted under 35 U.S.C. 154(b) by 999 days.

(21) Appl. No.: 12/374,620

(22) PCT Filed: Jul. 19, 2007

(86) PCT No.: PCT/ZA2007/000042  
§ 371 (c)(1),  
(2), (4) Date: Aug. 19, 2009

(87) PCT Pub. No.: WO2008/011641  
PCT Pub. Date: Jan. 24, 2008

(65) Prior Publication Data  
US 2009/0312448 A1 Dec. 17, 2009

(30) Foreign Application Priority Data

| Jul. 19, 2006 | (ZA) | 2006/00527 |
| Dec. 6, 2006 | (ZA) | 2006/10183 |
| Jan. 16, 2007 | (ZA) | 2007/00463 |
| Apr. 12, 2007 | (ZA) | 2007/02995 |
| May 7, 2007 | (ZA) | 2007/03648 |

(51) Int. Cl.  
C08F 8/00 (2006.01)  
B09B 3/00 (2006.01)  
C04B 33/04 (2006.01)  
C04B 35/626 (2006.01)  
C04B 35/63 (2006.01)  
C04B 35/634 (2006.01)  
C21B 13/00 (2006.01)  
C22B 1/244 (2006.01)  
C22B 7/02 (2006.01)

(52) U.S. Cl.  
CPC ............ B09B 3/0025 (2013.01); B09B 3/0033 (2013.01); C04B 33/04 (2013.01); C04B 35/62635 (2013.01); C04B 35/62695 (2013.01); C04B 35/6316 (2013.01); C04B 35/63416 (2013.01); C21B 13/0066 (2013.01); C22B 1/244 (2013.01); C22B 7/02 (2013.01); C04B 2235/3409 (2013.01); C04B 2235/3445 (2013.01); C04B 2235/349 (2013.01); C21B 2200/00 (2013.01)  
USPC ...... 524/2; 524/8; 524/59; 524/405; 524/543; 524/650; 525/56; 525/61; 264/117; 23/313 R

(58) Field of Classification Search  
USPC ........ 264/28, 44, 669, 670, 117; 524/2, 8, 59, 524/69, 405, 543, 650, 56, 61; 23/313 R  
See application file for complete search history.

(56) References Cited

U.S. PATENT DOCUMENTS

| 3,808,165 | A | * | 4/1974 | Duchane et al. ................ 524/99 |
| 3,852,401 | A | * | 12/1974 | Suzuki et al. ................. 264/182 |
| 4,131,581 | A | * | 12/1978 | Coker .......................... 524/141 |
| 4,384,047 | A | * | 5/1983 | Benzinger et al. ............. 521/64 |
| 4,439,488 | A | * | 3/1984 | Trimnell et al. ......... 428/402.24 |
| 4,440,746 | A | * | 4/1984 | Maglio .......................... 514/86 |
| 4,657,582 | A | | 4/1987 | Huber |
| 5,069,720 | A | | 12/1991 | Epperly et al. |
| 5,171,720 | A | * | 12/1992 | Kawakami ..................... 501/80 |
| 5,290,332 | A | * | 3/1994 | Chatterjee et al. ............ 65/17.3 |
| 5,843,351 | A | * | 12/1998 | Hirose et al. ................ 264/45.1 |
| 6,008,281 | A | | 12/1999 | Yang et al. |
| 6,174,453 | B1 | | 1/2001 | Harada et al. |
| 6,382,111 | B1 | | 5/2002 | Hojaji |
| 6,479,418 | B2 | * | 11/2002 | Li et al. ......................... 501/81 |
| 2005/0207928 | A1 | * | 9/2005 | Shimizu et al. ................ 419/2 |
| 2008/0060546 | A1 | | 3/2008 | Symons |

FOREIGN PATENT DOCUMENTS

| FR | 2337588 | | 8/1977 |
| JP | 50-108012 | * | 8/1976 |
| JP | 2006307295 A | * | 11/2006 |

OTHER PUBLICATIONS

International Preliminary Report on Patentability for Application No. PCT/ZA2007/000042, dated Jan. 20, 2009.  
Bassner, S.L. et al., "Using Poly(Vinyl Alcohol) as a Binder," *American Ceramic Society Bulletin*, vol. 77(6):71-75 (1998).  
International Search Report for Application No. PCT/ZA2007/000042, dated Jun. 20, 2008.  
DuPont, "Product Grades Listing," Elvanol Product Grades Listing retrieved online at: http://www2.dupong.com/Elvanol/en_US/products/, 2 pages (2014).  
DuPont, "Dupont PVA," Dupong PVA Polyvinyl Alcohol Elvanol 71-30,90-50,52-22,50-42,T-66 suppliers, retrieved online at: http:www.polyvinyl-alcohol.net/Dupont-pva.html, Liwei Chemical Co., Ltd., 1 page (2008).

* cited by examiner

*Primary Examiner* — Irina S Zemel  
(74) *Attorney, Agent, or Firm* — Nelson Mullins Riley & Scarborough LLP; Amy E. Mandragouras, Esq.; Erika L. Wallace

(57) ABSTRACT

The invention provides a method of agglomeration (10) which has the steps of mixing a feedstock (12) of small particles which have an average particle size of 3 mm or less with a binder (14) which is in the form of a polyvinyl alcohol in the form of an aqueous polyvinyl alcohol solution in a first blender (16) to form a binder mixture (18), reacting a gelling agent (20) with the feedstock and the binder and processing the binder mixture to deliver an agglomerate (22).

28 Claims, 3 Drawing Sheets

METHOD OF AGGLOMERATION

BACKGROUND OF THE INVENTION

The invention relates to a method of agglomeration for the recovery and size upgrading of small particles, for example from waste streams from industrial and mining activities.

The term small particles is used in this specification with reference to particles which have an average particle size of 3 mm or less.

In various industrial and mining activities products and by-products are produced either in the form of small particles or as dust. These products are often in the form of waste or are dangerous, difficult and costly to handle and transport.

For example carbonaceous particles, when mixed with air can lead to explosion and as a fuel the carbonaceous particles have the tendency to suppress combustion by oxygen occlusion. When metallic ores are added to a furnace as fine particles the ores can cause capping of the melt which can lead to eruption or violent gas release. Various mineral or carbonaceous particles in dust form are dangerous when inhaled. Mineral fines could be valuable and if in the right format could be subjected to further recovery processes.

It is known to dispose of such small particles or dust as a suspension in water. The suspension might be difficult to dry and could be dangerous if released from slimes dams by flooding. Wet small particles are particularly difficult to handle or recover. When the particles are subjected to further heat processing it is important to note that the feedstock in a sinter plant cannot contain too high a proportion of fine particles because the fine particles interfere with the porosity or permeability of the sinter bed and impede the movement of gas.

In the size upgrading of small particles, the most frequently used method has been by compression. Briquetting is an example and this can be achieved in a variety of ways including by way of contrary rotating roll presses or by way of a revolving, outer perforated cage wherein a roll press forces material caught between the roll press and the outer cage through apertures in the outer cage. Binders such as starch are optionally used in these processes. Alternatively a synergistic inclusion can be used, such as biomass in coal or Bentonite in metal ores.

The compression of small particles requires substantial energy, capital expenditure and specialised equipment which is prone to wear and tear. Additionally the compression of small particles inhibits subsequent drying of the agglomerate and can influence the behaviour of the agglomerate when it is subjected to high temperature. This is a function of the ease or otherwise of the release of either water vapour or volatiles, which can either impede drying or can result in the catastrophic disintegration of the agglomerate when subjected to temperature shock.

Another known method for the size upgrading of small particles is by first mixing the small particles with a liquid to form a damp and relatively free flowing mixture. The mixture is then deposited onto an inclined and rotating disc or cylinder and which increases in size by the aggregation of the particles on the disc. The size of the resulting agglomerate depends on its dwell time, the diameter and speed of the disc and whether or not a binder is sprayed onto the particles with further dry feedstock or not. The result is a rounded pebble which may be sintered. Once again the method is characterized by various advantages and disadvantages.

The shape of an agglomerate is of importance as a round shape minimises attrition on subsequent handling and variable size allows for good packing and better logistical efficiency. A pillow shaped particle or an extruded one has the disadvantage of high attrition associated with sharp edges and the advantage of the absence of cascading from or on an inclined plain such as a conveyor belt.

Preferably the size upgrading of small particles should allow for the control of the upgraded particle size across a wide spectrum. Additionally the size upgrading should take place during a continuous production with low wear, low capital cost, low running expense, ease of control and simplicity. The shape, integrity, resistance to attrition, resistance to water and behaviour at high temperature of the agglomerate should be controllable.

SUMMARY OF THE INVENTION

This invention aims to provide a method of agglomeration which might address some of the aforementioned disadvantages.

The invention provides a method of agglomeration of small particles which includes the step of mixing a feedstock of the small particles with a binder in the form of polyvinyl alcohol in the form of an aqueous polyvinyl alcohol solution to form a binder mixture.

The small particles may have an average size of less than 1 mm The small particles may be in the form of any one or combination of the following: mineral fines, metal fines, coal fines, gypsum, metallurgical reductants, biomass and pyrolytic residues.

The feedstock may include one or more different types of small particles.

The polyvinyl alcohol may be partially or fully hydrolysed. The polyvinyl alcohol may be partially hydrolysed with a degree of hydrolysis of 86 to 89 mol % or the polyvinyl alcohol may be fully hydrolysed with a degree of hydrolysis of 97 to 99.5 mol %.

The polyvinyl alcohol solution may be added to the feedstock in the proportion of 2% to 35% as a proportion by weight of the binder mixture. The polyvinyl alcohol in the polyvinyl alcohol solution may be at a concentration of between 2% and 15% as a proportion by weight of the polyvinyl alcohol solution. The polyvinyl alcohol in the polyvinyl alcohol solution may be added to the feedstock in the proportion of 0.2% to 2% as a proportion by weight of the binder mixture in a dry format.

The polyvinyl alcohol may have a molecular weight in the range 100 000 to 200 000 g/mol, a degree of polymerisation $P_w$ of between 2000 and 4500 and a viscosity at 4% concentration in water at 20° C. of between 16 and 50 mPa·s.

Alternatively the polyvinyl alcohol may have a molecular weight of between 100 000 and 170 000 g/mol, a degree of polymerisation $P_w$ of between 2500 and 3500 and a concentration in the binder mixture in the range of 0.3% to 1% as a proportion by weight of the binder mixture in a dry format.

The method preferably includes the step of reacting a gelling agent with the binder and feedstock to form an agglomerate. The gelling agent may be selected from any one or combination of boric acid, borax, sipiolite, latex, bentonite and smectite.

The method may include the step of mixing the feedstock with the gelling agent prior to mixing the binder with the feedstock. The feedstock may itself contain compounds that gel the binder, such as certain manganese and vanadium fines.

The method may include the step of mixing the binder and the gelling agent prior to, during or after the mixing of the binder with the feedstock.

The method may include the step of shaping the agglomerate. The agglomerate may be shaped by any one or combination of rolling, tumbling, vibrating, granulating, extruding, cutting, pressing, pelletising and briquetting.

The method may include the step of drying the agglomerate.

The method may include the step of mixing a filler with the binder mixture. The filler may be in the form of organic materials or inorganic fibres.

The method may include the step of mixing an additive with the binder mixture. The additive may include a pH modifier or a synergistic binder.

The method may include the step of foaming at least part of the binder prior to mixing the foamed binder with the feedstock.

The method may include the step of spraying the binder onto the feedstock.

BRIEF DESCRIPTION OF THE DRAWINGS

The invention is further described by way of examples with reference to the accompanying drawings in which.

DESCRIPTION OF PREFERRED EMBODIMENTS

Figure 1:
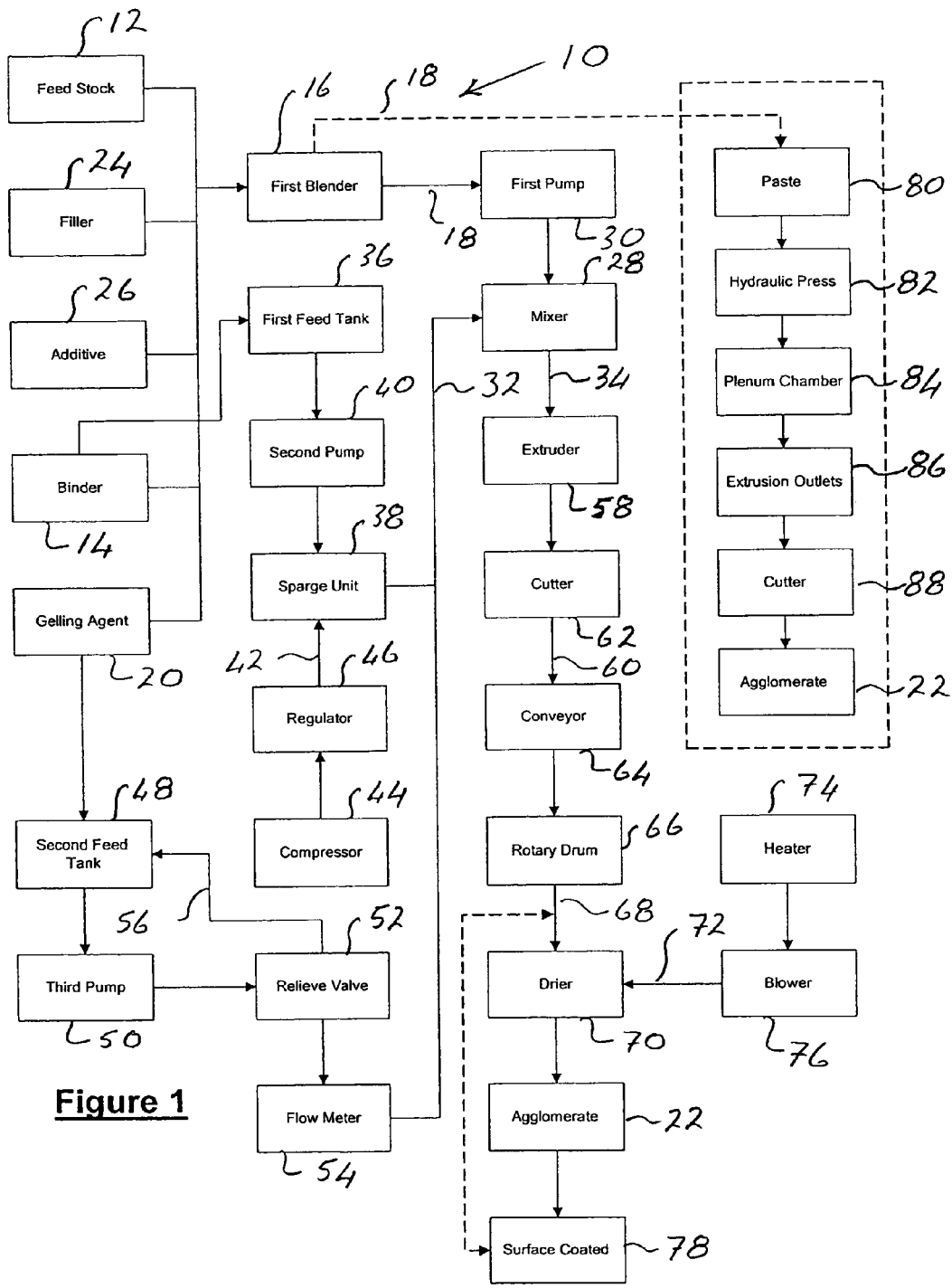
FIG. 1 is a schematic representation of a method of agglomeration according to the invention.

FIG. 1 illustrates a method of agglomeration 10 which includes the steps of mixing a feedstock 12 of small particles with a binder 14 in the form of a polyvinyl alcohol in the form of an aqueous polyvinyl alcohol solution in a first blender 16 to form a binder mixture 18. An appropriate gelling agent 20 is mixed and reacted with the feedstock 12 and the binder 14 in the first blender 16. Depending on requirements the binder mixture 18 is processed in different ways to deliver an agglomerate 22.

The feedstock 12 is made up of small particles of any one or more kinds or types such as mineral ore fines, metal fines, coal fines, gypsum, metallurgical reductants, biomass or pyrolytic residues. These particles can be wet or dry and can be in the form of a powder fines or a sludge.

The particles of the feedstock can have an average particle size of 3 mm and smaller, alternatively 1 mm and smaller and in some cases even 500 micron and smaller.

The binder 14 can be in the form of a partially or fully hydrolysed polyvinyl alcohol in the molecular weight range of 100 000 to 200 000 g/mol, or of 100 000 to 170 000 g/mol. If partially hydrolysed the polyvinyl alcohol has a degree of hydrolysis of 86 to 89 mol % and if fully hydrolysed the polyvinyl alcohol has a degree of hydrolysis of 97 to 99.5 mol %.

In the molecular weight range of between 100 000 to 200 000 g/mol the polyvinyl alcohol can have a degree of polymerisation Pw of between 2000 and 4500 and a viscosity at 4% concentration in water at 20° C. of between 16 and 50 mPa·s. Alternatively and in the molecular weight range of between 100 000 and 170 000 g/mol the polyvinyl alcohol can have a degree of polymerisation Pw of between 2500 and 3500 and a concentration in the binder mixture 18 in the range of 0.3% to 1% as a proportion by weight of the binder mixture 18 in a dry format or of the dry agglomerate 22.

The binder 14 is provided in a solution in water and has a concentration of between 2% and 15% as a proportion of weight of the solution with a target range of between 2.5% to 7.5% as a proportion of weight of the solution.

The binder 14 solution is added to the feedstock 12 at a range of between 2% to 35% as a proportion of weight of the binder mixture 18 with a target range of between 5% and 25% and a preferred target range of between 5% and 15% as a proportion of weight of the binder mixture 18. The polyvinyl alcohol in the polyvinyl alcohol solution is added to the feedstock 12 in the proportion of 0.2% to 2% as a proportion by weight of the binder mixture 18 in a dry format or of the dry agglomerate 22.

Polyvinyl alcohol acts as an excellent binder as it has good adhesive and film strength. The film has good tear strength as well as elongation at break. The partially hydrolysed polyvinyl alcohol grades have a higher elongation at break than the fully hydrolysed polyvinyl alcohol grades which are more rigid. This allows for choice depending on the application such as the required resistance to shock of the agglomerate 22.

The polyvinyl alcohol can be used as a binder on a dry weight basis of between 0.2% and 1% more preferably between 0.3% and 0.8% of the total agglomerate dry mass and between 1% and 1.5% by dry mass in the case of metallurgical reductants.

The film of polyvinyl alcohol has high gas impermeability and resistance to organic solvents but retains high moisture permeability. This benefit is of specific importance to applications where the agglomerate 22 is subjected to rapid drying or where devolatilisation of the agglomerate 22 takes place at elevated temperatures such as in a metallurgical furnace.

Different grades of polyvinyl alcohol have different advantages which allows for a wide spectrum of choice depending on application. For example the partially hydrolysed grades such as Mowiol 18/88, 23/88 and 26/88 by Clariant and G-types by Nippon Gohsei such as GH17 to GH22 and Celvol 518 by Celanese, have the property of good foaming capability which can propagate the inclusion of micro porosity or air cells in a coal product which makes it easier to dry, easier to grind, easier to ignite and once ignited, easier to sustain combustion with minimum loss of volatiles, in this way maximizing heat contribution.

The polyvinyl alcohols have increasing tensile strength with increasing degrees of polymerisation and molecular weight. The partially hydrolysed grades, at a given concentration in water, have a lower viscosity than the fully hydrolysed or saponified types. There is therefore an ideal molecular weight range at the acceptable concentration levels suitable for the invention. These are Mowiol grades 18/88, 23/88 and 26/88 by Clariant and the G-types GM14 and GH17 to GH22 by Nippon Gohsei and Celvol 518 by Celanese and in the fully hydrolysed or saponified grades, Mowiol 20/98 by Clariant and the Gohsenol N-types NH18, NH20, NN14 and N300 by Nippon Gohsei and Celvol 325 by Celanese with molecular weights in the range 100 000 to 170 000 g/mol and viscosities of a 4% solution at 20° C. in the range 16 to 30 mPa·s, with a degree of hydrolysis or saponification mol percent in the partially hydrolysed grades of between 86 and 89, an approximate ester value in mgKOH/g of 140±10 in the partially hydrolysed grades and in the fully hydrolysed grades, a degree of hydrolysis or saponification mol percent between 97 and 99 and an ester value of 20±5 mgKOH/g. Other than when controlled solubility is required such as for granulated gypsum, the fully hydrolysed grades are preferred.

Gelation of the polyvinyl alcohol can be controlled to control final product quality, imposing cohesion, improved binding, reduced stickiness in process and superior granulation, and subsequent green adhesion and cohesion of the wet granules when pressed or otherwise formed, which after drying, result in a strong agglomerate.

Other synergistic binders may be used in conjunction with a polyvinyl alcohol. Examples are lignosulphonates, thermoplastic dispersions, magnesium compounds, clays, Portland cement, natural latex, polyvinyl acetates, starches, sugars and celluloses, and inorganic salts, the alkali silicates in particular. Finely divided small dry particle form is the preferred method of addition so that the polyvinyl alcohol solution stability remains unaffected. Sodium silicate and clay, such as fire or ball clay, are the preferred high temperature synergistic binders.

There exist various suitable polyvinyl alcohols such as those by Clariant as depicted in the following table:

|   | Viscosity[1] mPa-s | | Degree of hydrolysis (saponification) mol % | | Ester value[2] mg KOH/g | | Residual acetyl content Wt % | | Max ash[3] |
|---|---|---|---|---|---|---|---|---|---|
| Mowiol 18-88 | 18 | ±1.5 | 87.7 | ±1.0 | 140 | ±10 | 10.8 | ±0.8 | 0.5 |
| Mowiol 23-83 | 23 | ±1.5 | 87.7 | ±1.0 | 140 | ±10 | 10.8 | ±0.8 | 0.5 |

Volatile matter (DIN 53 189): maximum 5% (after 3 h dry ng at 105° C.).
pH of a 4% solution in distilled water (DIN 19 260/61): 4.5-7 for partially and fully hydrolysed graded
Bulk density (DIN 53 468): approx 0.4-0.6 g cm³, depending on grade 4
[1]of a 4% aqueous solution at 20° C. (DIN 53 015)
[2](DIN 53 401)
[3]calculated as Na20

Solubility of polyvinyl alcohol in water and rigidity increase with increasing saponification and molecular weight. The fully hydrolysed grades such as N300 by Gohsenol or 20/98 by Clariant or Celvol 325 by Celanese have a high degree of water insolubility at room temperature and a higher capacity for gelation. These are preferred for agglomerate binding, and especially for agglomerate resistance to water.

Increasing drying temperature of the polyvinyl alcohol improves resistance to water solubility in both types but water proofing agents may also be used such as Glyoxal, Dimethylol Urea, or acids such as orthophosphoric acid or certain salts such as ammonium chloride or sodium/ammonium bichromate, these typically being added at 5% by mass on the polyvinyl alcohol.

The polyvinyl alcohols have less tendency to putrefaction, decomposition or polymerisation than most other binders.

Depending on requirement compounds can be added to the polyvinyl alcohol to inhibit gelation during storage or process until the required point in time. Examples are sorbic acid, rhodan salt or a higher alcohol.

Preservatives to prevent attack by micro-organisms such as sodium dehydroacetate, potassium sorbate or sodium pentachlorophenol can be added to the polyvinyl alcohol.

Dissolution of the polyvinyl alcohol is best done by dispersion at room temperature and then increasing the heat of the mixture to 90 to 95° C. Complete dissolution then takes place within 10 to 20 minutes.

It is preferable to use those grades with a molecular weight in the range 100 000 to 170 000 g/mol. The decision is influenced by the binding property. The higher the molecular weight the greater the bond, but in addition, the higher the molecular weight the higher the viscosity. The more fully hydrolysed grades are also characterized by a higher viscosity. The grade found to be most suitable for foaming because of viscosity in solution concentrations in the range 3 to 10% is Mowiol 18/88 or 23/88 or 26/88 by Clariant or Celvol 518 by Celanese.

|   |   | Molecular Weight Mw (g/mol) | Degree of Polymerization Pw |
|---|---|---|---|
| Partially hydrolysed grades of Polyvinyl Alcohol | Mowiol 18-88 | 130 000 | 2700 |
|  | Mowiol 23-88 | 150 000 | 3100 |
|  | Mowiol 26-88 | 160 000 | 3300 |
| Fully hydrolysed grades of Polyvinyl Alcohol | Mowiol 20-98 | 125 000 | 2800 |
|  | Mowiol 56-98 | 195 000 | 4300 |

Partially hydrolysed polyvinyl alcohols of molecular weights in the range 100 000 to 170 000 g/mol are preferred for foaming and would be used in the proportion of 2.5 to 10% by mass of the solution an example being Mowiol 18/88 by Clariant having a molecular weight of 130 000, degree of polymerisation of 2700 and a suitable viscosity, and has an ideal propensity to foam.

Examples of suitable grades by Nippon Gohsei.

| Grades | | Saponification degree mol % | | | | | Viscosity mPa * s(cp) | | | | | | | Ash Content % |
|---|---|---|---|---|---|---|---|---|---|---|---|---|---|---|
| | | 75 | 80 | 85 | 90 | 95 | 10 | 20 | 30 | 40 | 50 | 60 | 70 | |
| N Type GOHSENOL | NH-18 | | | | 98.5~99.0 | | | | 25~30 | | | | | 0.7> |
| Fully saponified type | N-300 | | | | 98.5~99.0 | | | | 25~30 | | | | | 0.7> |
| | NM-14 | | | | | 99.0< | | 20.5~24.5 | | | | | | 0.7> |
| G Type GOHSENOL | GH-17 | | | 86.5~89.0 | | | | | 27~33 | | | | | 0.7> |
| Partially saponified type | GM-14 | | | 86.5~89.0 | | | | 20.5~24.5 | | | | | | 0.7> |
| | GM-14L | | | 86.5~89.0 | | | 16~20 | | | | | | | 0.7> |

Examples of partially hydrolysed grade by Celanese is Celvol 518 and of a fully hydrolysed grade is Celvol 325.

Considerations influencing the choice of the polyvinyl alcohol grade are the following:
1. Molecular mass, degree of polymerisation and viscosity of an acceptable concentration in water. The optimum molecular weights are between 100 000 and 175 000 or 170 000 g/mol more specifically between 110 000 and 160 000 g/mol. The maximum concentration in water is approximately 15% more preferably 10% or 8% and the normal minimum would be 2.5%.
2. The propensity to gel where gelation is important and the gelation characteristics.
3. The solubility at room temperature in water. The fully hydrolysed or saponified grades are superior in this respect. In the case of minerals or coal, the greater the insolubility in water the better, consistent with easy wetting, gelation control, dissolution ease, cost, film integrity and binder strength. The partially hydrolysed grades are suitable for gypsum as a soil conditioner or for calcination to hemihydrate form whereas the more fully hydrolysed grades are more suitable for mineral recovery, were resistance to rain is important.
4. The drying temperature. The higher this is the greater the insolubility in water.
5. The percentage concentration required and its behaviour both in use and in drying.

The gelling agent 20 can be selected from a variety of appropriate gelling agents the use of which will depend on the specific application and the type of feedstock 12 used. Examples of gelling agents 20 are natural latex in water, pre-vulcanized or unvulcanized optionally stabilised with ammonia, sepiolite, bentonite and smectite. Additionally boric acid or one of the borates, borax in particular can be used as a gelling agent 20.

The gelling agent 20 which is particularly suitable to the method of the invention is the complex or association forming of polyvinyl alcohol by Borax in solution which is $Na_2B_4O_5(OH)_4 \cdot 8H_2O$ referred to as disodium tetraborate decahydrate. Borax partially hydrolyses to boric acid and acts as a buffer and the pH is shifted to alkaline. In the method of the invention borax is dissolved in water to give a solution concentration of 0.5% to 8% by mass, more preferably in the range 1% to 5%. This solution, when blended to the polyvinyl alcohol contained slurry is used in the range 1% to 7% of borax by dry mass on the mass of the polyvinyl alcohol, more preferably in the range 1.5% to 3%.

The blending of alkali silicates, such as spray dried sodium silicate or hydrated lime, with the feedstock can induce a movement to alkaline causing gelation on dissolution as the binder solution is blended.

Other gelling agents 20 which might be suitable are the elements of subgroups 1V to V1 of the periodic table. In some of these cases the complex which forms can be thermally fixed to give a polyvinyl alcohol insoluble film. An example is titanium-1V-triethanolamine complex which with polyvinyl alcohol solutions produces a highly viscous to gelling, titanium-1V complex. Titanium sulphate also reacts in a similar manner. Titanium 111, vanadium and chromium compounds cause gelling. Certain direct dyes, for example Congo red, produce gels and can act as a gelling agent 20. Organic compounds can produce gels, not always as powerfully as Congo red. Examples are the polyvalent phenols and related compounds such as resorcinol, Gallic and salicylic anhilide. Acetylisation of polyvinyl alcohol such as with formaldehyde and acid, which acts as a catalyst, can also cause thickening or gelling. In this simple way water insolubility can be imposed.

Acetylisation or cross linking of the polyvinyl alcohol may be achieved by the addition of formaldehyde HCH0, glyoxal which is OHC.CHO or glutaraldehyde which is $OHC.CH_2CHO$ as gelling agents 20. The presence of aldehydes in coal may be undesirable whereas in a furnace, all of the elements of these compounds will escape the melt.

The preferred gelling agent 20 on the grounds of performance is borax or boric acid which results in precipitation.

As stated before the natural latexes either pre-vulcanized or un-vulcanized can be used as a gelling agent 20. Those by Revertex are typical. An example of the pre-vulcanized 60% solution is HMR10 Revultex stabilised with ammonia. The un-vulcanized version of a natural latex solution can be induced to coagulate to form a continuous film by the addition of an alkali such as slaked lime or even bicarbonate of soda. Typical properties are modulus at a 100% elongation of 45 mPa and a tensile strength of 80 mPa with an elongation at break of as much as 82%. The significance in the method of the invention is the coagulation of the latex by a pH change. Granulation is then rapidly induced as the rubber strands pull the minute particles together.

Attapulgite and Sepiolite form the Hormite group are characterized by a complex magnesium aluminium silicate composition, open chain structure and elongate crystals. Both are clays with a chain type structure forming needle shaped crystals rather than flake-like as in the case of Bentonite. When dispersed the needle shaped crystals, which are 1 micron long and 0.1 micron wide are inert, and non-setting but form a random lattice entrapping liquid and providing thickening, suspending and gelling properties. The gel formed is a colloidal form of solids suspended in a liquid medium. Because of the extremely porous structure the effective surface area of Attapulgite is 150 m² per gram and for Sepiolite is 300 m² per gram. In addition the Hormites act as synergistic binders minimising friability and dusting and absorb more than their own weight in liquid. As a gelling agent 20, Hormites may be added in the range 0.5% to 3% by dry mass on the dry feed stock, more preferably in the range 0.5% to 1.5%. Bentonite and Smectite clays swell when immersed in water and have molecules with very high cation exchange capacity. Within the Smectite group, Montmorillonite is the most important commercially, in particular Bentonite. Synonyms for Bentonite include volcanic clay, soap clay, mineral soap, bleaching and absorbent clays and earths. Other examples of Smectite clays are Hectorite, Saphonite, Beidelite and Nontronite. Bentonite comprises loosely held silica/alumina sheets that can be easily subdivided in aqueous solutions into uni-celled particles 0.003 micron thick and less than 0.1 micron long. Bentonite has exchangeable sodium, calcium or magnesium cations and exhibits immense ion exchange capacity. Sodium Bentonite has the highest swelling capacity. Calcium Bentonite is also highly effective. Hectorite on the other hand has viscosities and swelling properties higher than that of Montmorillonite. Hectorite blended with Montmorillonite provides physical properties promoting gelling. Saphonite has absorbent properties promoting clumping.

When immersed in water relatively large flakes of sodium Bentonite disperse into colloidal particles which activates dormant electrical chemical energy aparting dilatancy i.e. swelling by up to 15 to 30 times original dry bulk volume without agitation. In addition viscosity increases and thixotrophy is maximised. It is this that gives the gelling strength. Sodium Bentonite has excellent plasticity, dry bonding strength and high mechanical strength both when green or fired. Application levels are between 0.5% and 3% and may in certain circumstances be as high as 10% of dry mass of the feed stock. Sodium Bentonite is more stable at high temperature than Calcium Bentonite. Bentonite may be used synergistically with Attapulgite and will absorb at least 5 times its own weight in water.

When the polyvinyl alcohol gels as a result of the gelling agent 20, it looses all tack and becomes non-sticky. In addition it envelopes part of the feedstock 12 as an integral part of the gel giving it considerable cohesive properties and allowing the creation of the agglomerate 22 which has limited breakage, friability, parting or fissures as a result of reasonable handling during further production.

Depending on requirements a filler 24 and additives 26 can be mixed with the feedstock 12, binder 14 and gelling agent 20 in the first blender 16 to form the binder mixture 18. The filler 24 can be in the form of inorganic fibres chosen from monofilaments such as rock wool, mineral wool, glass wool, ceramic wool or metallic wool or alternatively in the form of organic materials, fibres and fines in the form of any available biomass such as wood particles or other plant residue.

The organic fillers 24 can be used to internally oxygenate the agglomerate 22 to ensure complete burning of volatiles during combustion thereby maximising heat contribution and to allow the binder mixture 18 to be easily pumped or agglomerated to produce a uniform and consistent product.

The additives 26 can be in the form of any one or combination of a pH modifier which can be alkaline, a synergistic binder, gelation inhibitors, a water-proofing agent or preservatives.

The binder mixture 18 is pumped from the first blender 16 to a mixer 28 by way of a first pump 30. In the mixer 28 and depending on requirements at least part of the binder 14 which is in the form of a foam 32 is mixed with the binder mixture 18 to produce a foam mixture 34.

The foam 32 is produced by pumping at least a portion of the binder 14 which is in a water solution into a first feed tank 36. From the first feed tank 36 the binder is pumped into a known sparge unit 38 by way of a second pump 40. The binder 14 is pumped into the sparge unit 38 at a constant and controllable flow-rate and pressure. Air 42 is simultaneously delivered to the sparge unit 38 at a constant and regulated pressure and volume. The air 42 is produced by a compressor 44 and moves through a regulator 46 before entering the sparge unit 38.

In the sparge unit 38 the binder 14 and air 42 are mixed in a known manner to produce the foam 32 at a constant flow-rate, pressure and density.

Depending on requirements the rate at which the binder mixture 18 and the foam 32 are introduced into the mixer 28 is regulated.

Depending on requirements some or all of the gelling agent 20 can be fed directly to the mixer 28 where it is mixed with the binder mixture 18 and foam 32. The gelling agent 20 which directly enters the mixer 28 is pumped to the mixer 28 from a second feed tank 48 by way of a third pump 50. The gelling agent 20 is pumped through a relief valve 52 and a flow meter 54 which is used to control the pressure and volume of the gelling agent 20 being introduced into the mixer 28. The relief valve 52 has a pressure release 56 which is connected to the second feed tank 48 and through which any excess gelling agent 20 is returned to the second feed tank 48.

The foam mixture 34 gels as a result of the gelling agent 20 and the feedstock 12 is encapsulated by the binder 14. The foam mixture 34 is thereafter, and depending on the nature of the feedstock 12 and requirements subjected to a variety of shaping processes. For example the foam mixture 34 is in certain applications extruded through an extruder 58 and the extruded lengths are cut into appropriate chunks 60 by a cutter 62. The chunks 60 are conveyed by a conveyor 64 and fed into a rotary drum 66 wherein the chunks 60 are further shaped by way of rotation into rounded lumps 68. Alternatively to the rotary drum 66 any other appropriate mechanism such as vibrating, cascading or mixing can be used to form the chunks 60 into appropriately sized lumps 68. Depending on use of the lumps 68, same might be in the form of granules in the average size range of 2 mm to 6 mm, pebbles in the average size range of 6 mm to 25 mm, balls in the average size range of 25 mm to 45 mm or spheres in the size range of 45 mm and greater.

The lumps 68 can be dried in a dryer 70 through which heated air 72 is fed which is produced by a heater 74 which is connected to a blower 76.

The final product or agglomerate 22 exits from the dryer 70.

The lumps 68 can be dried rapidly and the agglomerate 22 has good green strength and resistance to catastrophic disintegration when subjected to high temperature. The hardness and resistance to attrition of the agglomerate 22 are controlled by the percentage of the binder 14 which is added to the feedstock 12.

The agglomerate 22 can optionally be surface-coated in a step 78. For example an agglomerate 22 produced from mineral fines can be surfaced either before or after drying with an inorganic high temperature resistant surface coating such as for example an alkaline silicate solution, a magnesium chloride solution or dispersion or a solution of hydrated lime in water.

Where the agglomerate 22 will be exposed to elevated temperatures it can be beneficial to add an auxiliary high temperature stable binder in dry small particle form as an additive 26. This type of additive 26 can be chosen from any one of an alkali, an alkali earth metal oxide, Portland cement, calcium aluminate cement, lime or most preferably a spray dried sodium or potassium silicate or a clay with an initial softening point below 600° C. or a Hormite or Smectite.

Lime in the form of calcium oxide has the advantage that it is exotherm on hydration which can be useful in increasing the vapour pressure of any contained water during the drying step 70.

The auxiliary high temperature binder additive 26 stabilises the agglomerate 22 when positioned in a furnace until melt and the binder 14 holds the agglomerate 22 together in an economic manner during handling, conveying and transport.

In FIG. 1 an alternative processing of the binder mixture 18 is illustrated by way of dotted outlines. This alternative process is for example employed where the feedstock 12 consists of manganese fines.

In this case the binder mixture 18 is mixed to a paste 80 in the first blender 16. While remaining in the first blender 16 an hydraulic press 82 is brought into contact with the paste 80 and the paste 80 is compressed in the first blender 16 and forced into a plenum chamber 84. The paste 80 is extruded from the plenum chamber 84 through various extrusion outlets 86 from the plenum chamber 84. The extruded paste 80 is thereafter cut into appropriate lengths of the agglomerate 22 by a cutter 88.

Figure 2:
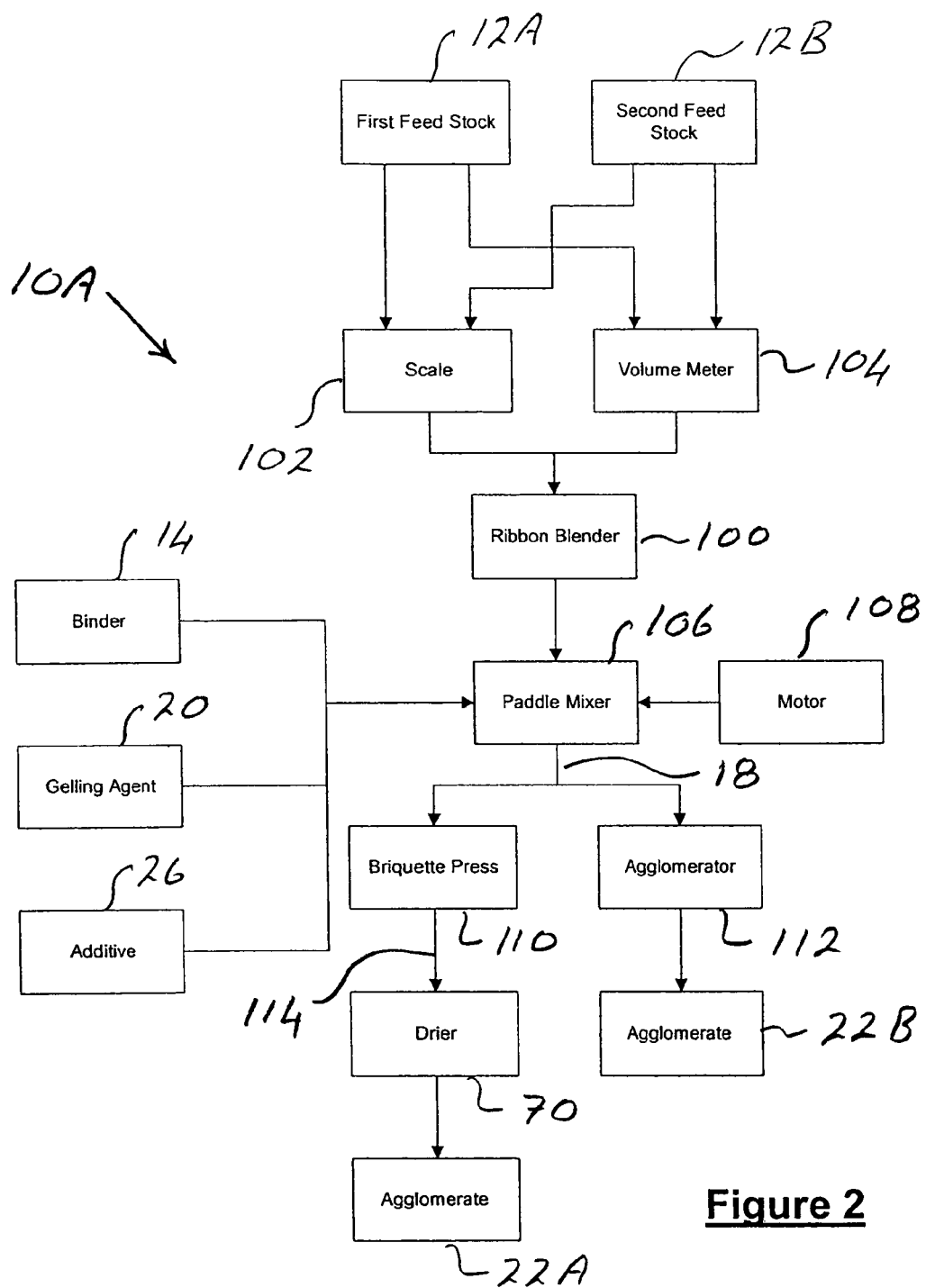
FIG. 2 is a schematic representation of an alternative method of agglomeration according to the invention.

FIG. 2 illustrates an alternative method of agglomeration 10A which is used for the agglomeration of a first and optionally a second feedstock 12A, 12B. The first and second feedstock 12A, B is in the form of metal ore or coal fines.

Depending on the required composition of the agglomerate 22A produced by the method 10A different combinations of the first and second feedstock 12A, 12B are fed into a ribbon blender 100. The quantities of the first and second feedstock 12A, B which are fed to the ribbon blender 100 can alternatively be measured by weight by way of a scale 102 or a volume meter 104.

The first and second feedstock 12A, B are mixed in the ribbon blender 100 and fed to a paddle mixer 106. A required combination of the binder 14 and the gelling agent 20 is fed to the paddle mixer 106 where the binder 14 is mixed with the first and second feedstock 12A, B and then reacted with the gel agent 20. The paddle mixer 106 is driven by a motor 108 and the speed at which the paddle mixer 106 operates is controlled depending on the gelation rate of the binder mixture 18 which is produced in the paddle mixer 106.

The binder mixture 18 is alternatively fed to a briquette press 110 or an agglomerator 112. In the briquette press 110 the binder mixture 18 is formed into briquettes 114 which are dried in a dryer 70 to produce the agglomerate 22A which is in the form of a briquette. In the agglomerator 112 the binder mixture 18 is formed into granules, pebbles, balls or spheres from which the agglomerate 22B results. Depending on requirements additives 26 can be fed to the paddle mixer 106 together with the binder 14 and gelling agent 20.

Figure 3:
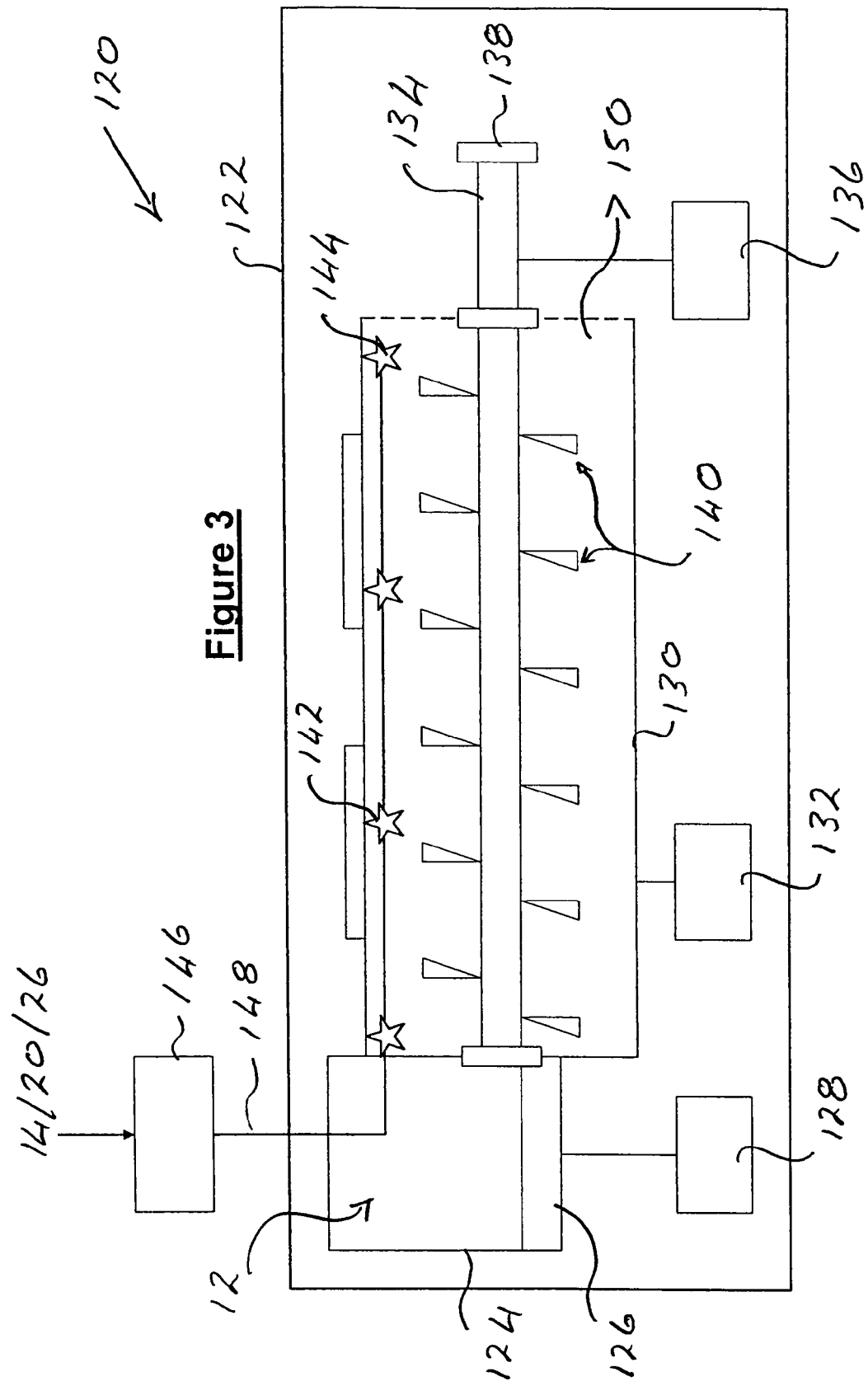
FIG. 3 is a schematic illustration of a blender used in the methods of agglomeration according to the invention.

FIG. 3 illustrates a blender or mixer 120 which can be used in the methods 10 and 10A of FIGS. 1 and 2.

The blender 120 has a stand or frame 122 which supports an inlet hopper 124 wherein an appropriate mixture of feedstock 12 is fed into. Depending on requirements the binder 14, gelling agent 20, filler 24 and additives 26 can be premixed with the feedstock 12. An auger conveyor 126 is positioned at the bottom of the hopper 124 and is driven by a first motor 128. The auger 126 feeds the feedstock 12 from the hopper 124 into a revolving cylinder 130 at a controlled rate. The cylinder 130 is rotated by a second motor 132 and rotates in either direction around a rotating central shaft 132. The shaft 134 is independently rotated by a third motor 136.

The cylinder 130 and the shaft 134 are carried on appropriate bearings 138 and the rotation speed of the cylinder 130 and the shaft 134 can be independently controlled.

A plurality of paddles or tines 140 extend from the shaft 134 in the cylinder 130. The shape and configuration of the tines 140 can vary depending on requirements and are adjustable through lockable inspection hatches 142 in the cylinder 130.

A plurality of spray nozzles 144 are positioned inside the cylinder 130 and are connected to a pump 146 by way of a conduit 148. Appropriate mixtures of binder 14, gelling agent 20 and additives 26 are fed to the pump 146 and pumped to the nozzles 144 through the conduit 148.

In use the auger 126 moves the feedstock 12 from the hopper 124 into the cylinder 130 where the feedstock 12 is agitated by the tines 140. The binder 14, gelling agent 20 and additives 26 are sprayed onto the feedstock 12 in the cylinder 130 by way of the nozzles 144. This causes binding and gelation of the feedstock 12 into agglomerates 22 which can exit the cylinder 130 through an exit 150.

The relative rotation speed of the cylinder 130 and the shaft 134 and the speed at which the feedstock 12 is fed into the cylinder 130 by the auger 126 are variable and are used to control the size of the agglomerate 22 exiting from the cylinder 130. For example the higher the rate of feed of the feedstock 12 into the cylinder 130 and the lower the relative rotation speed of the cylinder 130 and shaft 134 the larger is the agglomerate 22 which is produced. The slower the feed and the higher the relative rotation speed of the cylinder 130 and shaft 134 the smaller is the agglomerate 22 which is produced.

The length of the cylinder 130 and shaft 134 may be varied in order to obtain better rounding of the agglomerate 22.

The methods 10 and 10A and the blender 130 can be used for either wet or dry agglomeration. During wet agglomeration the feedstock 12 is in suspension and during dry agglomeration the feedstock is in the form of a substantially dry and free-flowing powder or particulate form.

Various feedstocks 12 can be processed according to the methods 10 and 10A and in the blender 120 to provide a variety of agglomerates 22. For example the methods 10 and 10A and the blender 120 can be used in the production of granules in the size range 2½ mm to 4 mm such as granules of guano for the fertilization of golf course greens, the production of a granular fertilizer in the size range 4 mm from gypsum which is used as a soil conditioner and into which is added water soluble nutrients or herbicides or insecticides, the production of granules of 6 mm to 25 mm for metal fines, and coal for the pea market for industry, a size of 25 mm to 45 mm for reductants for use in furnaces and balls greater than 45 mm for domestic coal or reductant use in furnaces.

During the agglomeration of mineral fines, ores or slimes, the presence of the foam 32 in the method 10 confers a cellular core to the agglomerate 22 which is important to propagate rapid drying. The inclusion of a monofilament fibre as filler 24 also assists and serves to hold the agglomerate 22 together as the temperature exceeds 300° C. through to melt point at over 1000° C. The fibre of choice is monofilament glass wool. A further option in the core of the agglomerate is the use of sodium Bentonite or others of the Smectite and Montmorillonite clays or Attapulgite or sepiolites added to the mix in the range of up to 6% but preferably between 0.5 and 4% by mass of the total composition. Alternatively a fire or China clay may be added in dry small particle form which has a low initial softening or vitrification point. Either before or after drying, preferably after drying, the agglomerate 22 may be surface coated by cascading in or spraying with a solution of an alkali silicate preferably a sodium silicate, because of its ready availability, low cost and refractoriness. Suitable specifications are a silicate to sodium oxide ratio in the range 2 to 3.5 to 1 and a solid percentage in the range 20 to 45%. A typical ideal formulation is Silchem 3379 by Silicate and Chemical Industries of South Africa, a member of the Unilever group. This has an SG of 1.3952 $SiO_2$ 29.07% $Na_2O$ 8.8% solids 37.88% and a weight ratio $SiO_2$ to $Na_2O$ of 3.3 to 1.0. To this solution may typically be added up to 20% by mass of water before the agglomerate 22 is coated. This may then be dried directly or in order to cause the sodium silicate to set as a binder and which has now coated the agglomerate 22 an open chain diacid ester may be added which then saponifies, giving rise to an acid fraction which sets the alkali silicate. An example of a suitable hardener of this type is Carset hardeners of Foseco of which the most rapid setting is 533 and the medium set is 544. These are added to the sodium silicate in weight range 5 to 20% by mass more preferably in the range 10 to 12.5%.

Alternatively alkali silicate may be added as a spray dried very small particle size powder such as Pyramid P60 by Crossfield of the UK Sodium silicate is the preferred silicate binder. It has a softening point of 900° C. but is an excellent binder from room temperature upwards. Either a sodium di-silicate or tri-silicate is used as sprayed dried powders the di-hydrate at a typical Mol. ratio of 2 to 2.2 with a NA20 percentage of between 25% and 27% and an SIO2 percentage of 52% to 54%. The preferred binder however is the tri silicate form such as Pyramid 60 by Crossfield at a Mol. ratio SIO2 to NA20 of 3.2 to 3.5, an NA20 percentage of 18% to 20% and SIO2 percentage of 62% to 65% with 60% to 85% of particle sizes between 60 microns and 200 microns.

Similarly slaked lime which can also act as a de-sulphurising agent in coals or other metal ores destined either to be burnt or processed at elevated temperature by converting sulphur dioxide to calcium sulphate and in this way having the sulphur report to the ash rather than the atmosphere. In addition the slaked lime combines with carbon dioxide to form calcium carbonate as a binder. Alternatively Portland cement containing over 64% of lime can act as a synergistic high temperature binder. The disadvantage is the time taken for cement hydration and of the three options the sodium silicate is preferred. Binding takes place immediately on drying, the polyvinyl alcohol provides auxiliary room temperature binding with the considerable properties that it brings to the agglomeration process. The dissolution of both the slaked lime and the sodium silicate takes approximately 90 seconds after which gelation of the polyvinyl alcohol occurs. This is ideal for continuous production in the agglomeration of feed stocks comprising of small particles. The size of the final granules or pebbles is a function of the process. The higher the energy input the smaller the granule size and the longer the dwell time in the agglomerator the larger the pebble size.

The use of polyvinyl alcohol as a water soluble colloidal binder 14 and foam precursor 32 which is affective at very low concentrations, which has good particle wetting properties and which combust without smoke or any form of pollution is important as it helps to hold the agglomerate 22 in its wet state until drying is complete, allows rapid drying, ensures distribution without breakage and presents no hazard in use.

As a specific example of the method of the invention a sample of coal slimes from Sasol Mining where tested to have a free water percentage by mass of 24.4%. To this was added 41 g of a 7½% solution of a polyvinyl alcohol Gohsenol N300 by Japan Gohsei and thoroughly blended. The paste was then agglomerated after the addition of 10 g of a 1% solution of borax in water in sizes from 6 mm to 25 mm was air dried and sent to the Sasol R&D Laboratories for testing for both mechanical and high temperature stability by a standard mining and synfuel production test method.

The test report stated that the pellets were tested for mechanical and thermal stability. To do the mechanical fragmentation test, a known amount of +6.7 mm agglomerates 22 were tumbled 5 minutes in a specially designed micum drum. The tumbled agglomerates 22 were then screened at 6.7 mm and the mechanical fragmentation determined as the % −6.7 mm particles. The result was 2.2% which seems to be satisfactory for handling.

The thermal fragmentation was determined by pyrolysing a known amount of the +6.7 mm agglomerates 22 from a temperature of 100° C. to 700° C. in 1 hr. The char was then screened at 6.7 mm and the thermal fragmentation determined as the % −6.7 mm particles. The result was 2.3% which also seems to be satisfactory.

The methods 10 and 10A require low capital cost, allows for continuous production, results in minimum wear and tear, have low power requirement and allow for adjustability of agglomerate sizes and shapes.

The feedstock 12 is agglomerated at a relatively high speed and low cost. Drying of the agglomerate 22 is rapid. Bulk density of the agglomerate 22 is high and briqetting can be successfully carried out even when the water content of the feedstock 12 would otherwise result in an unhandleable paste. Dwell time of the binder mixture 18 in the blenders or mixers is low allowing minimal capital expenditure for fast production.

Feedstocks 12 which are in the form of wet paste such as coal slimes is converted to free flowing granules and certain feedstocks 12 such as certain manganese or vanadium feedstocks which are in the form of dry fines are granulated without a paste stage or gel addition because they contain polyvinyl alcohol gel propagating components. The wet agglomerates 22 can be pressed to blocks or sheets or briquetted, and excess water is pressed out without loss of the gelled binder 14.

The invention claimed is:

1. A method of agglomerating small particles in a wet feedstock containing the small particles, the method including
   (i) forming a binder mixture by mixing the wet feedstock with a binder in the form of an aqueous polyvinyl alcohol solution containing polyvinyl alcohol in a proportion of 2% to 15% by weight of the polyvinyl alcohol solution, such that the polyvinyl alcohol is present in the binder mixture in a proportion of 0.2% to 2% by weight of the binder mixture on a dry basis, wherein the aqueous polyvinyl alcohol solution comprises a polyvinyl alcohol that is fully hydrolysed with a degree of hydrolysis of 97 mol% to 99.5 mol%, and
   (ii) reacting a gelling agent comprising borax in the proportion of 1% to 7% by weight of the polyvinyl alcohol on a dry basis with the polyvinyl alcohol, thereby inducing cohesive gelation of the polyvinyl alcohol and forming a gelled polyvinyl alcohol which envelops at least a portion of the small particles as an integral part thereof, wherein none of the polyvinyl alcohol, the polyvinyl alcohol solution, and the binder mixture, is or has been subjected to a foaming operation during the method, and wherein the gelled polyvinyl alcohol enveloping the small particles is water resistant, having a high degree of water insolubility at room temperature.

2. A method of agglomeration according to claim 1 wherein the small particles have an average size of less than 3 mm.

3. A method of agglomeration according to claim 1 wherein the polyvinyl alcohol has a molecular weight of between 100 000 and 170 000 g/mol.

4. A method of agglomeration according to claim 3 wherein the polyvinyl alcohol has a degree of polymerization Pw of between 2500 and 3500.

5. A method of agglomeration according to claim 3 wherein the polyvinyl alcohol concentration in the gelled polyvinyl alcohol enveloping the small particles is in the range of 0.3% to 1% as a proportion by weight of the gelled polyvinyl alcohol enveloping the small particles on a dry basis.

6. A method of agglomeration according to claim 1 which includes the step of mixing the feedstock and the gelling agent prior to the mixing of the binder with the feedstock.

7. A method of agglomeration according to claim 1 which includes the step of shaping the gelled polyvinyl alcohol enveloping the small particles.

8. A method of agglomeration according to claim 1 which includes the step of drying the gelled polyvinyl alcohol enveloping the small particles.

9. A method of agglomeration according to claim 1 which includes the step of mixing a filler with the binder mixture, the filler being selected from organic fibres and inorganic fibres.

10. A method of agglomeration according to claim 1 which includes the step of mixing an additive with the binder mixture.

11. A method of agglomeration according to claim 10 wherein the additive includes a Ph modifier.

12. A method of agglomeration according to claim 10 wherein the additive includes a synergistic binder, being selected from a cellulose compound, a sodium bentonite, and a calcium bentonite.

13. A method of agglomeration according to claim 1 wherein the feedstock includes the small particles in suspension.

14. A method of agglomeration according to claim 13 wherein the feedstock has a free water content of up to 24.4%.

15. A method of agglomeration according to claim 1, which includes adding to the feedstock a filler comprising a clay.

16. A method of agglomeration according to claim 1 wherein the small particles have an average particle size of 1 mm or smaller.

17. A method of agglomeration according to claim 1 wherein the small particles have an average particle size of 500 microns or smaller.

18. A method of agglomeration according to claim 1 wherein the borax is used in diluted form as an aqueous solution of between 1% and 5% borax in water.

19. A method of agglomeration according to claim 7, wherein the gelled polyvinyl alcohol enveloping the small particles is shaped by any one or combination of rolling, tumbling, vibrating, granulating, extruding pressing, pelletising and briquetting.

20. A method of agglomeration according to claim 1 wherein, by shaping the gelled polyvinyl alcohol enveloping the small particles by means of pressing or briquetting the gelled polyvinyl alcohol enveloping the small particles, excess water is pressed out of the gelled polyvinyl alcohol enveloping the small particles without loss of the gelled polyvinyl alcohol.

21. A method of agglomeration according to claim 1, which includes cross-linking the polyvinyl alcohol by reacting formaldehyde, glyoxal or glutaraldehyde with the polyvinyl alcohol.

22. A method of agglomeration according to claim 1, wherein the polyvinyl alcohol solution is added to the feedstock in the proportion of 2% to 15% as a proportion by weight of the binder mixture.

23. A method of agglomeration according to claim 1, wherein the polyvinyl alcohol has a molecular weight in the range 100 000 to 200 000 g/mol.

24. A method of agglomeration according to claim 23, wherein the polyvinyl alcohol has a degree of polymerization Pw of between 2000 and 4500.

25. A method of agglomeration according to claim 23, wherein the polyvinyl alcohol has a viscosity at 4% concentration in water at 20° C. of between 16 and 50 mPa·s.

26. A method of agglomeration according to claim 1, wherein the gelled polyvinyl alcohol enveloping the small particles is devoid of tack and non-sticky.

27. A method of agglomeration according to claim 1, wherein the small particles are one or more of mineral ore fines, metal fines, coal fines, gypsum metallurgical reductants, biomass and pyrolytic residues.

28. A method of agglomeration according to claim 27, wherein the wet feedstock of small particles is in the form of a sludge.

* * * * *